United States Patent
Gerkis

(10) Patent No.: US 10,045,356 B2
(45) Date of Patent: Aug. 7, 2018

(54) APPARATUS, SYSTEM AND METHOD FOR THE TRANSMISSION OF DATA WITH DIFFERENT QOS ATTRIBUTES

(71) Applicant: WI-LAN INC., Ottawa (CA)

(72) Inventor: Anthony Gerkis, Toronto (CA)

(73) Assignee: Wi-LAN Inc., Ottawa (CA)

( * ) Notice: Subject to any disclaimer, the term of this patent is extended or adjusted under 35 U.S.C. 154(b) by 0 days.

(21) Appl. No.: 15/456,218

(22) Filed: Mar. 10, 2017

(65) Prior Publication Data

US 2017/0188369 A1 Jun. 29, 2017

Related U.S. Application Data

(63) Continuation of application No. 15/229,869, filed on Aug. 5, 2016, now Pat. No. 9,603,159, which is a
(Continued)

(30) Foreign Application Priority Data

Jul. 15, 2002 (CA) ..................... 2393373

(51) Int. Cl.
*H04W 72/08* (2009.01)
*H04L 12/863* (2013.01)
(Continued)

(52) U.S. Cl.
CPC ......... *H04W 72/08* (2013.01); *H04L 47/6215* (2013.01); *H04W 28/14* (2013.01); *H04W 88/08* (2013.01)

(58) Field of Classification Search
CPC ..... H04W 72/08; H04W 28/14; H04W 88/08; H04L 47/6215
See application file for complete search history.

(56) References Cited

U.S. PATENT DOCUMENTS 5,166,675 A 11/1992 Amemiya et al.
5,541,919 A 7/1996 Yong et al.
(Continued)

FOREIGN PATENT DOCUMENTS

CA     2309563 A1    11/2000
CN    03157038.0 S    8/2000
(Continued)

OTHER PUBLICATIONS

Marchent et al. "Support of Mobile Multimedia over Radio for a Wide Range of QoS and Traffic Profiles." IEEE International Conference on Personal Wireless Communications Proceedings, 1999, pp. 145-149.
(Continued)

*Primary Examiner* — Duc C Ho
(74) *Attorney, Agent, or Firm* — Procopio, Cory, Hargreaves & Savitch LLP

(57) ABSTRACT

An apparatus, system and method are provided for transmitting data from logical channel queues over a telecommunications link, each of the logical channel queues capable of being associated with quality of service attributes, the method including determining available resources for transmission over the telecommunications link in a frame; selecting one of the logical channel queues based on a first one of the quality of service attributes; packaging data from the selected one of the logical channel queues until one of: a second one of the quality of service attributes for the selected one of the logical channel queues is satisfied, the available resources are used, or the selected one of the logical channel queues is empty; and repeating the selecting step and the packaging step for remaining ones of the logical channel queues.

3 Claims, 7 Drawing Sheets

Related U.S. Application Data continuation of application No. 14/506,510, filed on Oct. 3, 2014, now Pat. No. 9,426,816, which is a continuation of application No. 14/292,380, filed on May 30, 2014, now Pat. No. 8,867,351, which is a continuation of application No. 14/102,120, filed on Dec. 10, 2013, now Pat. No. 8,817,805, which is a continuation of application No. 13/468,925, filed on May 10, 2012, now Pat. No. 8,630,238, which is a continuation of application No. 12/028,365, filed on Feb. 8, 2008, now Pat. No. 8,184,661, which is a continuation of application No. 10/521,581, filed as application No. PCT/CA03/01043 on Jul. 11, 2003, now Pat. No. 7,333,435.

(51) Int. Cl.
*H04W 28/14* (2009.01)
*H04W 88/08* (2009.01)

(56) References Cited

U.S. PATENT DOCUMENTS

| | | |
|---|---|---|
| 5,570,355 A | 10/1996 | Dail et al. |
| 5,596,577 A | 1/1997 | Perreault |
| 5,608,606 A | 3/1997 | Blaney |
| 5,640,395 A | 6/1997 | Hamalainen et al. |
| 5,644,573 A | 7/1997 | Bingham et al. |
| 5,724,168 A | 3/1998 | Oschmann et al. |
| 5,751,708 A | 5/1998 | Eng et al. |
| 5,784,695 A | 7/1998 | Upton et al. |
| 5,790,534 A | 8/1998 | Kokko et al. |
| 5,802,465 A | 9/1998 | Hamalainen et al. |
| 5,815,660 A | 9/1998 | Momona |
| 5,896,561 A | 4/1999 | Schrader et al. |
| 5,903,373 A | 5/1999 | Welch et al. |
| 5,956,341 A | 9/1999 | Galand et al. |
| 6,041,051 A | 3/2000 | Doshi et al. |
| 6,067,301 A | 5/2000 | Aatresh et al. |
| 6,075,787 A | 6/2000 | Bobeck et al. |
| 6,115,390 A | 9/2000 | Chuah |
| 6,138,020 A | 10/2000 | Galyas et al. |
| 6,141,336 A | 10/2000 | Bauchot et al. |
| 6,198,728 B1 | 3/2001 | Hulyalkar et al. |
| 6,216,006 B1 | 4/2001 | Scholefield et al. |
| 6,226,338 B1 | 5/2001 | Earnest |
| 6,295,285 B1 | 9/2001 | Whitehead |
| 6,327,254 B1 | 12/2001 | Chuah |
| 6,366,761 B1 | 4/2002 | Montpetit |
| 6,370,153 B1 | 4/2002 | Eng |
| 6,374,112 B1 | 4/2002 | Widegren |
| 6,377,809 B1 | 4/2002 | Rezaiifar et al. |
| 6,381,228 B1 | 4/2002 | Prieto, Jr. et al. |
| 6,434,164 B1 | 8/2002 | Matsunaga |
| 6,438,134 B1 | 8/2002 | Chow et al. |
| 6,438,386 B2 | 8/2002 | Joshi |
| 6,470,016 B1 | 10/2002 | Kalkunte et al. |
| 6,483,805 B1 | 11/2002 | Davies et al. |
| 6,542,481 B2 | 4/2003 | Foore et al. |
| 6,553,446 B1 | 4/2003 | Miller |
| 6,567,416 B1 | 5/2003 | Chuah |
| 6,577,613 B1 | 6/2003 | Ramanathan |
| 6,603,738 B1 | 8/2003 | Kari et al. |
| 6,621,791 B1 | 9/2003 | Davie |
| 6,628,945 B1 | 9/2003 | Koorapaty et al. |
| 6,650,624 B1 | 11/2003 | Quigley et al. |
| 6,661,806 B1 | 12/2003 | Eriksson et al. |
| 6,714,562 B1 | 3/2004 | Calvignac et al. |
| 6,728,540 B1 | 4/2004 | DeSantis et al. |
| 6,754,196 B1 | 6/2004 | Daane et al. |
| 6,771,653 B1 | 8/2004 | Le Pennec et al. |
| 6,778,521 B1 | 8/2004 | Korpela et al. |
| 6,795,865 B1 | 9/2004 | Bahl et al. |
| 6,804,251 B1 | 10/2004 | Limb et al. |
| 6,845,100 B1 | 1/2005 | Rinne |
| 6,850,504 B1 | 2/2005 | Cao et al. |
| 6,850,540 B1 | 2/2005 | Peisa et al. |
| 6,879,832 B1 | 4/2005 | Palm et al. |
| 6,958,989 B1 | 10/2005 | Dick et al. |
| 6,993,340 B1 | 1/2006 | Rinne et al. |
| 7,023,799 B2 | 4/2006 | Takase |
| 7,058,974 B1 | 6/2006 | Maher, III et al. |
| 7,142,563 B1 | 11/2006 | Lin |
| 7,151,758 B2 | 12/2006 | Kumaki et al. |
| 7,230,937 B2 | 6/2007 | Chi et al. |
| 7,263,064 B2 | 8/2007 | Yoshimura et al. |
| 7,321,780 B2 | 1/2008 | Love et al. |
| 7,339,906 B1 | 3/2008 | Dahlby et al. |
| 7,406,098 B2 | 7/2008 | Taneja et al. |
| 7,474,668 B2 | 1/2009 | Bauman et al. |
| 7,489,701 B2 | 2/2009 | Lodha |
| 7,508,792 B2 | 3/2009 | Petrovic et al. |
| 7,570,618 B2 | 8/2009 | Son et al. |
| 7,613,148 B2 | 11/2009 | Hong et al. |
| 7,636,570 B2 | 12/2009 | Cho et al. |
| 7,675,926 B2 | 3/2010 | Olsen et al. |
| 7,693,517 B2 | 4/2010 | Etemad et al. |
| 7,734,796 B2 | 6/2010 | Schelen et al. |
| 7,809,373 B2 | 10/2010 | Park et al. |
| 7,818,006 B2 | 10/2010 | Kim et al. |
| 7,944,577 B2 | 5/2011 | Chang et al. |
| 7,945,263 B2 | 5/2011 | Noll et al. |
| 8,027,298 B2 | 9/2011 | Stanwood et al. |
| 8,064,401 B2 | 11/2011 | Anigstein et al. |
| 8,131,295 B2 | 3/2012 | Wang et al. |
| 8,184,661 B2 | 5/2012 | Gerkis |
| 8,229,437 B2 | 7/2012 | Bourlas et al. |
| 8,248,014 B2 | 8/2012 | Berman et al. |
| 8,274,954 B2 * | 9/2012 | Farley ............... H04L 5/0055 370/335 |
| 8,311,040 B2 | 11/2012 | Stanwood et al. |
| 8,312,142 B2 | 11/2012 | Rinne |
| 8,315,640 B2 | 11/2012 | Stanwood et al. |
| 8,331,933 B2 | 12/2012 | Koo et al. |
| 8,670,359 B2 | 3/2014 | Kim et al. |
| 8,713,641 B1 | 4/2014 | Pagan et al. |
| 8,867,351 B2 | 10/2014 | Gerkis |
| 2001/0051992 A1 | 12/2001 | Yang et al. |
| 2002/0032788 A1 | 3/2002 | Emanuel et al. |
| 2002/0132611 A1 | 9/2002 | Immonen et al. |
| 2003/0016648 A1 | 1/2003 | Lindsay et al. |
| 2003/0067903 A1 | 4/2003 | Jorgensen |
| 2003/0186724 A1 | 10/2003 | Tsutsumi et al. |
| 2003/0223420 A1 | 12/2003 | Ferolito |
| 2004/0001491 A1 | 1/2004 | Ruutu et al. |
| 2004/0013089 A1 | 1/2004 | Taneja et al. |
| 2004/0017825 A1 | 1/2004 | Stanwood et al. |
| 2004/0081093 A1 | 4/2004 | Haddock et al. |
| 2004/0090914 A1 | 5/2004 | Briscoe |
| 2004/0095892 A1 | 5/2004 | Sampath et al. |
| 2004/0100919 A1 | 5/2004 | Jang |
| 2004/0156354 A1 | 8/2004 | Wang et al. |
| 2004/0163084 A1 | 8/2004 | Devadas et al. |
| 2004/0176094 A1 | 9/2004 | Kim et al. |
| 2004/0248583 A1 | 12/2004 | Satt et al. |
| 2005/0030931 A1 | 2/2005 | Sung et al. |
| 2005/0041573 A1 | 2/2005 | Eom et al. |
| 2005/0053029 A1 | 3/2005 | Lee et al. |
| 2005/0054389 A1 | 3/2005 | Lee et al. |
| 2005/0058058 A1 | 3/2005 | Cho et al. |
| 2005/0063330 A1 | 3/2005 | Lee et al. |
| 2005/0117539 A1 | 6/2005 | Song et al. |
| 2005/0124344 A1 | 6/2005 | Laroia et al. |
| 2005/0157678 A1 | 7/2005 | Mantha et al. |
| 2005/0185651 A1 | 8/2005 | Rinne |
| 2005/0192011 A1 | 9/2005 | Hong et al. |
| 2005/0208945 A1 | 9/2005 | Hong et al. |
| 2005/0250499 A1 | 11/2005 | Lee et al. |
| 2005/0266861 A1 | 12/2005 | Rajkotia |
| 2006/0025134 A1 | 2/2006 | Cho et al. |
| 2006/0025158 A1 | 2/2006 | Leblanc et al. |
| 2006/0083160 A1 | 4/2006 | Koo et al. |
| 2006/0120285 A1 | 6/2006 | Pathak et al. |
| 2007/0032255 A1 | 2/2007 | Koo et al. |

(56) References Cited

U.S. PATENT DOCUMENTS

| | | |
|---|---|---|
| 2007/0037576 A1 | 2/2007 | Subramanian et al. |
| 2007/0104177 A1 | 5/2007 | Hwang et al. |
| 2007/0149206 A1 | 6/2007 | Wang et al. |
| 2007/0191009 A1 | 8/2007 | Hong et al. |
| 2007/0258407 A1 | 11/2007 | Li et al. |
| 2008/0013489 A1 | 1/2008 | Anigstein et al. |
| 2008/0056295 A1 | 3/2008 | Loda et al. |
| 2008/0102771 A1 | 5/2008 | Joshi et al. |
| 2008/0165755 A1 | 7/2008 | Marinier |
| 2008/0268844 A1 | 10/2008 | Ma et al. |
| 2009/0046605 A1 | 2/2009 | Gao et al. |
| 2009/0168793 A1 | 7/2009 | Fox et al. |
| 2010/0157928 A1 | 6/2010 | Spinar et al. |
| 2013/0308644 A1 | 11/2013 | Ferguson et al. |

FOREIGN PATENT DOCUMENTS

| | | |
|---|---|---|
| GB | 2324686 A | 10/1998 |
| WO | 199827747 A2 | 6/1998 |
| WO | 01078441 A1 | 10/2001 |
| WO | 0191407 A1 | 11/2001 |
| WO | 02001758 A1 | 1/2002 |
| WO | 04008698 A2 | 1/2004 |
| WO | 2005040960 A2 | 5/2005 |

OTHER PUBLICATIONS

International Search Report for related PCT/CA03/01043, dated Feb. 18, 2004, in 5 pages.
Passas et al. "Quality-of-Service Oriented Medium Access Control for Wireless ATM Networks." Communication Networks Laboratory, Department of Informatics, University of Athens. 1997. 23 pages.
ETSI-GSM Technical Specification GSM 08.52 Version 3.0.2 dated Feb. 1992.
G.R.J. Linnenbank, P. Venkataram, P.J.M. Havinga, S.J. Mullender, G.J.M. Smit, "A Request—TDMA Multiple- Access Scheme for Wireless Multimedia Networks," Sep. 25, 1996.
GSM 01.02 Version 6.0.1 dated Nov. 1998.
GSM 04.60 version 6.0.0 dated Mar. 1998. Digital cellular telecommunication system (Phase 2+); GPRS; Mobile Station (MS)—Base Station System (BSS) Interface; Radio Link Control/Medium Access Control (RLC/MAC) Protocol.
Hsiang-Jung Chiu, "Fast Base Station Switching for Realtime Services in IP-based OFDMA Systems with Fractional Frequency Reuse".
http://www.etsi.org/technologiesclusters/technologies/mobile/cellular-history (last visited Oct. 17, 2017).
http://www.gsmworld.com/aboutus/history (last visited Oct. 17, 2017).
IEEE 802.16.1mc-00/10 dated Feb. 2000.
IEEE C802.16e-03/21r1dated Mar. 11, 2003.
IEEE C802.16e-051282r2 dated Jul. 10, 2005.
IEEE C802.16e-318 dated Jul. 14, 2005.
IEEE Std 802.16 16e-2005 and IEEE Std 802.16-2004/Cor1-2005 (Amendment and Corrigendum to IEEE Std 802.16-2004).
Information Sciences Institute, "DARPA Internet Program Protocol Specification," Sep. 1981.
J. M. DeVile, "A Reservation Based Multiple Access Scheme for a Future Universal Mobile Telecommunication System," IEE 1993, 210-215.
Jennifer Rexford, Flavio Bonomi, Albert Greenberg, Albert Wong, "A Scalable Architecture for Fair Leaky-Bucket Shaping."
Jin Seek Choi and Hyeong Ho Lee, "A Dynamic Wavelength Allocation Scheme with Status Information for Fixed-and Variable-Length Messages," 1998 IEEE, 2358-2362.
Khun-Jush et al., "HIPERLAN Type 2 for Broadband Wireless Communication" (2000).
Konstantinos Dimou and Philippe Godlewski, "MAC Scheduling for Uplink Transmission in UMTS WCDMA," 2001 IEEE, 2625-2629.
Konstantinos Sambanis's Thesis: "Quality of Service in IPBased Networks," Mar. 2001.
M. Mouly and M. B. Pautet, "The GSM System for Mobile Communications," Cell & Sys, 1992.
Masayuki Kawagishi, Seiichi Sampei and Norihiko Morinaga, "A Novel Reservation TDMA Based Multiple Access Scheme Using Adaptive Modulation for Multimedia Wireless Communication Systems," 1998 IEEE, 112-116.
Matthias Malkowski and Silke Heier, "Interaction between UMTS MAC Scheduling and TCP Flow Control Mechanisms," Apr. 9-11, 2003, 1373-1376.
N. M. Mitrou, Th. D. Orinos, and E. N. Protonotarios, "A Reservation Multiple Access Protocol for Microcellular Mobile-communication Systems," 1990 IEEE, 340-361.
RAN2#54, R2-062271, Tallinn, Estonia, Aug. 28-Sep. 1, 2006.
Richard O. LaMaire, Arvind Krishna, and Pravin Bhagwat, "Wireless LANs and Mobile Networking: Standards and Future Directions," 1996 IEEE, 86-94.
Silke Heier and Matthias Malkowski, "Quality of Service Scheduling for UMTS," Apr. 22-25, 2003, 529-533.
TSG-RAN Meeting #19, Birmingham, UK, Mar. 11-14, 2003, RP-030100.
ETSI TS 125 211 v3.1.1 dated Jan. 2000.
Andrew Richardson, WCDMA Design Handbook, 2005.
Bernet, Y., et al. "An Informal Management Model for Diffsery Routers." 2002.
Brainslav M. Popovic and Oskar Mauritz, "Random Access Preambles for Evolved UTRA Cellular System," 2006 IEEE, 488-492.
Brian P. Crow, Indra Widjaja, Jeong Geun Kim, Prescott T. Saki, "IEEE 802.11 Wireless Local Area Networks".
C. Thomas et al., "An 8-User UMTS Channel Unit Processor for 3GPP Base Station Applications," 2003 IEEE, 275-278.
Christine Fragouli, Vijay Sivaraman, Mani B. Srivastava, "Controlled Multimedia Wireless Link Sharing via Enhanced Class-Based Queuing with Channel-State-Dependent Packet Scheduling," 1998 IEEE, 572-580.
Chu, Guosong, et al. "A QoS Architecture for the MAC Protocol of IEEE 802.16 BWA System." IEEE 2002 International Conference on Communications, Circuits and Systems and West Sino Expositions, 2002.
Chunhung Richard Lin and Mario Gerla, "Asynchronous Multimedia Multihop Wireless Networks," 1997 IEEE, 118-125.
Chunhung Richard Lin and Mario Gerla, "Real-time support in multihop wireless networks," (1999) 125-135.
Deborah A. Dyson and Zygmunt J. Haas, "A Dynamic Packet Reservation Miltiple Access Scheme for Wireless ATM," 1997 IEEE, 687-693.
ETSI TS 125 211 v4.6.0 dated Sep. 2002.
ETSI TS 125 213 v3.1.1 dated Jan. 2000.
ETSI TS 125 213 v4.4.0 dated Dec. 2003.
ETSI TS 125 214 v3.2.0 dated Mar. 2000.
ETSI TS 125 214 v4.6.0 dated Mar. 2003.
ETSI-GSM Technical Specification GSM 03.09 Version 3.2.1 dated Feb. 1992.
ETSI-GSM Technical Specification GSM 05.01 Version 3.2.2 dated Feb. 1992.
ETSI-GSM Technical Specification GSM 05.02 Version 3.8.0 dated Dec. 1995.
ETSI-GSM Technical Specification Gsm 05.10 Version 3.5.1 dated Oct. 1992.
ETSI-GSM Technical Specification GSM 08.02 Version 3.3.1 dated Feb. 1992.
ETSI-GSM Technical Specification GSM 08.08 Version 3.10.1 dated Feb. 1992.
3GPP TS 34.123-1 v5.1.0 dated Sep. 2002. Technical Specification Group Terminals; User Equipment (UE) Conformance Specification; Part 1: Protocol Conformance Specification (Release 5).
GSM 04.08 version 6.0.0 dated Apr. 1998. Digital cellular telecommunications system (Phase 2±); Mobile radio interface layer 3 specification.

(56) References Cited

OTHER PUBLICATIONS

"Intra-LTE Handover operation"—3GPP TSG-RAN WG2 Meeting #53, R2-061135, Shanghai, China, May 8-13, 2006.
J. Ala-Laurila and G. Awater, "The Magic WAND Wireless ATM Network Demonstrator System," Proceeding of ACTS Mobile Communication Summit '97 (1997) at 356-362.
GSM 04.60 v6.0.0 dated Mar. 1998.
F. Bauchot, G. Marmigere, N. Passas, L. Merakos and S. Decrauzat, "Mascara: A MAC Protocol for Wireless ATM," Nov. 1996.
GSM 01.02 Version 5.0.0 dated Mar. 1996.
GSM 03.64 version 6.0.0 dated Apr. 1998. Digital cellular telecommunications system (Phase 2+); General Packet Radio Service (GPRS); Overall description of the GPRS radio interface; Stage 2.
GSM 03.60 version 6.0.0 dated Mar. 1998. Digital cellular telecommunications system (Phase 2+); General Packet Radio Service (GPRS); Service description; Stage 2.
GSM 04.64 version 6.0.0 dated Mar. 1998. General Packet Radio Service (GPRS); Mobile Station—Serving GPRS Support Node (MS-SGSN) Logical Link Control (LLC) Layer Specification.
GSM 05.10 version 6.1.0 dated Jan. 1998. Digital cellular telecommunications system (Phase 2+); Radio subsystem synchronization.
GSM 05.05 version 6.1.0 dated Apr. 1998. Digital cellular telecommunications system (Phase 2+); Radio transmission and reception.
N. Passas et al., "MAC Protocol and Traffic Scheduling for Wireless ATM Networks," Sep. 1998.
N. Passas et al., "Traffic Scheduling in Wireless ATM Networks," May 1997.
R.C.V. Macario, "Modem Personal Radio Systems," IEE Telecommunications Series 33, 1996.
Richard Wayne Kautz, "Scheduling and Resource Allocation in Broadband Multimedia Wireless Local Area Networks," 1998.
Wi-LAN, Inc. et al. v. LG Electronics, Inc. et al. "Defendants and Counterclaim—Plaintiffs LG Electronics, Inc., LG Electronica U.S.A., Inc., and LG Electronics Mobilecomm U.S.A., Inc.'s Preliminary Invalidity Contentions pursuant to Patent Local Rule 3.3." Case No. 3:17-cv-00358-BEN-BGS, United States District Court, Southern District of Claifornia. Oct. 20, 2017 (inclusive of Exhibits A-C).
Z. Zhang, I. Habib and T. Saadawi, "Bandwidth Reservation for Multimedia Traffic Over Micro Cellular Network," 1997 IEEE, 761-765.
Siddharth Shrikant Pisal, "Physical Layer Comparative Study of WiMAX and LTE," 2012.
The ATM Forum Technical Committee, "Traffic Management Specification Version 4.1," af-tm-0121.000, Mar. 1999.
The ATM Forum, "ATM User-Network Interface (UNI) Signalling Specification Version 4.0," af-sig-0061.000, Jul. 1996.
U.S. Appl. No. 60/815,023 to Wang, filed Jun. 20, 2006.
Wai-Choong Wong and David J. Goodman, "Integrated Data and Speech Transmission Using Packet Reservation Multiple Access," 1993IEEE, 172-176.
Wi-Lan USA, Inc. and Wi-Lan, Inc. v. Telefonaktiebolaget LM Ericsson and Ericsson Inc., Case No. 12cv23569-Middlebrooks, Order Granting Motion for Summary Judgment, May 22, 2015.
Wi-Lan USA, Inc., Wi-Lan, Inc. v. Ericsson, Inc., Telefonaktiebolaget LM Ericsson, 15-1766, 15-1794.
N. Giroux and S. Ganti, "Quality of Service in ATM Networks: State-of-the-Art Traffic Management," Prentice Hall, 999. Copy not provided.
Wi-LAN Inc. et al. v. Lenovo (United States) Inc. et al. "Complaint for Infringement of U.S. Pat. Nos. 8,787,924, 8,867,351, 9,226,320, & 9,497,743." 3:17-cv-00365-AJB-NLS, United States District Court for the Southern District of California. Feb. 23, 2017.
Wi-LAN Inc. et al. v. Lenovo (United States) Inc. et al. "First Amended Complaint for Infringement of U.S. Pat. Nos. 8,787,924, 8,867,351, 9,226,320, & 9,497,743." 3:17-cv-00365-BEN-MDD, United States District Court for the Southern District of California. May 26, 2017.
Wi-LAN Inc. et al. v. Lenovo (United States) Inc. et al. Lenovo's "Answer and Defenses." 3:17-cv-00365-BEN-BGS, United States District Court for the Southern District of California. May 5, 2011.
Wi-LAN Inc. et al. v. Lenovo (United States) Inc. et al. Motorola's "Answer and Defenses." 3:17-cv-00365-BEN-BGS, United States District Court for the Southern District of California. May 5, 2017.
Wi-LAN Inc., et al. v. LG Electronics, Inc., et al. "Plaintiffs' Answer to Defendants LG Electronics, Inc., LG Electronics U.S.A., Inc., and LG Electronics Mobilecomm U.S.A., Inc.'s Counterclaims." 3:17-cv-00358-BEN-MDD. United States District Court for the Southern District of California. Jun. 12, 2017.
Wi-LAN, Inc., et al. v. LG Electronics, Inc., et al. "Complaint for Infringement of U.S. Pat. Nos. 8,787,924, 8,867,351, 9,226,320, & 9,497,743." 3:17-cv-00358-MMA-BGS. United States District Court for the Southern District of California. Feb. 22, 2017.
Wi-LAN, Inc., et al. v. LG Electronics, Inc., et al. "Defendants LG Electronics, Inc., LG Electronics U.S.A., Inc., and LG Electronics Mobilecomm U.S.A., Inc.'s Answer to Complaint, Affirmative Defenses, and Counterclaims." 3:17-cv-00358-BEN-BGS. United States District Court for the Southern District of California. May 22, 2017.
N. Giroux and S. Ganti, "Quality of Service in ATM Networks: State-of-the-Art Traffic Management," Prentice Hall, 1999.
"Cell Switching in LTE_Active State"—3GPP TSG-RAN WG2 Meeting #53, R2-061196, Shanghai, China May 8-12, 2006.
"Content of initial Unsynchronized RACH access and contention resolution"—3GPP TSG RAN WG2 Meeting #54, R2-062107, Tallinn, Estonia, Aug. 28-Sep. 1, 2006.
"Feasibility of Handover Reference," 3GPP TSG-RAN WG2 Meeting #54, R2-062191, Tallinn, Estonia, Aug. 28-Sep. 1, 2006.
"Intra-LTE handover procedure by using dedicated signature"—3GPP TSG-RAN WG2 Meeting #56bis, R2-070029, Sorrento, Italy, Jan. 15-19, 2007.
"Intra-RAT Handover Access Procedure," 3GPP TSG-RAN WG2 Meeting #52, R2-061229, Shanghai, China, May 8-12, 2006.
"Mobility in LTE Active"—3GPP TSG-RAN WG2 Meeting #52, R2-060915, Athens, Greece, Mar. 27-31, 2006.
"Multiplexing in HSDPA"—3GPP TSG-RAN WG2 Meeting #26, R2-020138, Sophia Antipolis, France, Jan. 7-11, 2002.
"Non contention based HO"—3GPP TSG-RAN WG2 Meeting #56bis, R2-070011, Sorrento, Italy, Jan. 15-19, 2007.
"Non-contention based handover procedure on RACH channel"—3GPP TSG-RAN WG2 Meeting #55, R2-062809, Seoul, Korea, Oct. 9-13, 2006.
"Non-Synchronized Random Access in E-UTRAN"—3GPP TSG-RAN WG2 Ad-Hoc on LTE, R2-061866, Cannes, France, Jul. 27-30, 2006.
"Random Access Procedures," 3GPP TSG-RAN WG2 Adhoc on LTE, R2-061881, Cannes, France, Jun. 27-30, 2006.
"Random access with dedicated preambles at handover"—3GPP TSG-RAN WG2 #57, R2-071422, St Julian's, Malta, Mar. 26-30, 2007.
"System Broadcast"—3GPP TSG-RAN WG2 Meeting #53, R2-061459, Shanghai, China, May 8-12, 2006.
"UL Timing Sync Procedure"—3GPP TSG RAN2 Meeting #52, R2-0601006, Athens, Greece Mar. 27-30, 2006.
3GPP TR 25.912 v0.2.0 dated Jun. 2006. Technical Specification Group Radio Access Network; Feasibility Study for Evolved UTRA and UTRAN (Release 7).
3GPP TS 23.009 v5.8.0 dated Mar. 2004. Technical Specification Group Core Network; Handover procedures (Release 5).
3GPP TS 23.108 v5.0.0 dated Jun. 2002. Technical Specification Group Core Network (CN); Mobile radio interface layer 3 specification, Core network protocols—Stage 2 (Release 5).
Baker, F., et al., "Management Information Base for the Differentiated Services Architecture." 2002.
3GPP TS 44.018 v5.11.0 dated Jul. 2003. Technical Specification Group GSM/EDGE Radio Access Network; Mobile radio interface layer 3 specification; Radio Resource Control (RRC) protocol (Release 5).
3GPP TS 45.001 v5.9.0 dated Apr. 2005. Technical Specification Group GSM/EDGE Radio Access Network; Physical layer on the radio path; General description (Release 5).

(56) References Cited

OTHER PUBLICATIONS

3GPP TS 45.002 v5.10.0 dated Jun. 2003. Technical Specification Group GSM EDGE Radio Access Network; Multiplexing and multiple access on the radio path (Release 5).
3GPP TS 45.010 v5.3.0 dated Aug. 2003. Technical Specification Group GSM/EDGE Radio Access Network; Radio subsystem synchronization (Release 5).
3GPP TS 48.002 v5.1.0 dated Feb. 2002. Technical Specification Group GSM EDGE Radio Access Network; Base Station System—Mobile-services Switching Centre (BSS-MSC) interface; Interface principles (Release 5).
3GPP TS 48.008 v5.9.0 dated Jul. 2003. Technical Specification Group GSM/EDGE Radio Access Network; Mobile Switching Centre—Base Station System (MSC-BSS) interface; Layer 3 specification (Release 5).
3GPP TS 48.052 v5.0.1 dated Dec. 2002. Technical Specification Group GSM EDGE Radio Access Network; Base Station Controller—Base Transceiver Station (BSCBTS) interface; Interface principles (Release 5).
A. Baiocchi, F. Cuomo, L. Del'Uomo and U. Teloni, "A MAC Protocol Supporting IP With QOS Guarantees in a Wireless Local Loop," 1999 IEEE, 1162-1166.
Anthony Hung, Marie-Jose Montpetit and George Kesidis, "ATM via Satellite: A Framework and Implementation," Apr. 15, 1996.
"E-UTRA Random Access Channel TP from email discussion"—3GPP TSG-RAN WG1 Meeting #44-bis, R1-060885, Athens, Greece, Mar. 27th-30th, 2006.
3GPP TS 23.107 v3.0.0 dated Oct. 1999. Technical Specification Group Services and System Aspects; QoS Concept and Architecture.
Corner et al., "A Priority Scheme for the IEEE 802.14 MAC Protocol for Hybrid Fiber-Coax Networks," INFOCOM '98, Seventeenth Annual Joint Conference of the IEEE Computer and Communications Societies, Mar. 29-Apr. 2, 1998, vol. 3, pp. 1400-1407.
Defendants and Counterclaim-Plaintiffs LG Electronics, Inc., LG Electronics U.S.A., Inc. and LG Electronics Mobilecomm U.S.A., Inc.'s Amended Invalidity Contentions pursuant to Patent Local Rule 3.6(b). Jan. 16, 2018.
DOCSIS Data-Over-Cable Service Interface Specifications, SP-RFlv.1.1-I01-990311, available Mar. 11, 1999.
DOCSIS Data-Over-Cable Service Interface Specifications, SP-RFlv1.1-I04-0980724, available Jul. 24, 1998.
IEEE Std. 802.16-2004.
Kautz et al., "A Distributed Fair Queueing (DFQ) Architecture for Wireless ATM Local Access Networks," International Journal of Wireless Information Networks, 2000.
Lin, Ying-Dar, "On IEEE 802.14 Medium Access Control Protocol," IEEE Communications Surveys, Fourth Quarter 1998, vol. 1 No. 1.
Mangold et al., "IEEE 802.11e Wireless LAN for Quality of Service," Proceedings European Wireless '2002, Feb. 2002.
Wing-Chung Hung, "A Distributed Fair Queuing MAC Scheduler for Wireless ATM Network," University of Toronto 1997.
"Andrew Tanenbaum, Computer Networks (Prentice Hall PTR,1996) ("Tanenbaum")".
CV of Dr. Robert Akl.
Declaration of Dr. Robert Akl regarding Inter Parte Review No. 2018-00709 for U.S. Pat. No. 8,867,351, dated Feb. 26, 2018
Declaration of Dr. Robert Akl regarding Inter Parte Review No. 2018-00710 for U.S. Pat. No. 8,867,351, dated Feb. 26, 2018.
"Harry Newton, Newton's Telecom Dictionary (CMP Books, 2004)("Newton")".
*LG Electronics, Inc., LG Electronics U.S.A., Inc., LG Electronics Mobilecomm U.S.A., Inc.*, Petitioner, v. *Wi-Lan Inc., Wi-Lan USA, Inc., Wi-Lan Labs, Inc.*, Patent Owner. "Petition for Inter Partes Review inder 35 U.S.C. § 312 and 37 C.F.R. § 42.104." IPR2018-00709, U.S. Pat. No. 8,867,351. Filed Feb. 27, 2018 (exhibits listed separately).
*LG Electronics, Inc., LG Electronics U.S.A., Inc., LG Electronics Mobilecomm U.S.A., Inc.*, Petitioner, v. *Wi-Lan Inc., Wi-Lan USA, Inc., Wi-Lan Labs, Inc.*, Patent Owner. "Petition for Inter Partes Review inder 35 U.S.C. § 312 and 37 C.F.R. § 42.104." IPR2018-00710, U.S. Pat. No. 8,867,351. Filed Feb. 27, 2018 (exhibits listed separately).
Newton's Telecom Dictionary.
Per Johansson et al., Short Range Radio Based Ad-hoc Networking: Performance and Properties, 1999 IEEE International Conference on Communications, Jun. 6-10, 1999, pp. 1414-1420 ("Johansson").
Prosecution File History of the '351 Patent.
The prosecution history of U.S. Pat. No. 7,333,435.
U.S. Appl. No. 60/385,868 ("Bauman Provisional").

\* cited by examiner

APPARATUS, SYSTEM AND METHOD FOR THE TRANSMISSION OF DATA WITH DIFFERENT QOS ATTRIBUTES

CROSS-REFERENCE

This application is a continuation of U.S. patent application Ser. No. 15/229,869, filed on Aug. 5, 2016; which is a continuation of U.S. Ser. No. 14/506,510, filed on Oct. 3, 2014, now U.S. Pat. No. 9,426,816; which is a continuation of U.S. patent application Ser. No. 14/292,380, filed on May 30, 2014, now U.S. Pat. No. 8,867,351; which is a continuation of U.S. patent application Ser. No. 14/102,120, filed on Dec. 10, 2013, now U.S. Pat. No. 8,817,805; which is a continuation of U.S. patent application Ser. No. 13/468,925, filed May 10, 2012, now U.S. Pat. No. 8,630,238; which is a continuation of U.S. patent application Ser. No. 12/028,365, filed Feb. 8, 2008, now U.S. Pat. No. 8,184,661; which is a continuation of U.S. patent application Ser. No. 10/521,581, filed Jan. 18, 2005, now U.S. Pat. No. 7,333,435, the contents of which are incorporated herein by reference in their entireties.

FIELD

The present disclosure relates to an apparatus, system and method for transmitting data flows that have different quality of service (QoS) attributes over a network link. More specifically, the present disclosure relates to an apparatus, system and method for providing and managing QoS for data flows transmitted over at least one link in a data network capable of transmitting data with different QoS requirements and/or attributes.

BACKGROUND

One of the most ubiquitous data networks to date has been the Internet which is a packet data network employing the Internet Protocol (IP) as its network layer protocol. IP provides many advantages as a network layer protocol, including robustness and simplicity of implementation and one of its original principles is that the network layer need not know anything about the contents of the packets it transmits. In other words, to IP, a packet was a packet was a packet. Similarly, IP is intended to work independently of the physical layer of the network. In other words, IP is ignorant of whether the network it is operating over is an optical network or a wireline network, etc.

More recently, much effort has been spent in creating converged networks wherein diverse types of data can be handled by a single network. For example, packet data networks are now often able to carry voice (telephony) data, "pure" data (such as data file transfers, emails, etc.), fax data, streaming video, video conferencing, etc. Many of these converged networks also employ IP as their network protocol.

While IP continues to be the network layer protocol of choice for many modern networks, data from different user applications in a converged network can require different transmission characteristics to be provided for them. For example, data packets from and/or to telephony voice coders require relatively low end-to-end transmission latencies, but can accommodate relatively high error rates and/or dropped packets. In contrast, data packets from a file transfer protocol (FTP) session can accommodate relatively long latencies, but cannot well accommodate errors or dropped packets. Data packets carrying fax data using the T.38 protocol require both low latency and low error rates. The specific requirements for the acceptable transmission of the contents of a data packet are generally referred to as the required quality of service (QoS) for the data. As originally designed, IP did not contemplate providing different QoS levels for packets.

To provide some measure of QoS control in IP, the fourth version of the protocol, typically referred to as IPv4, provided a Type of Service (TOS) byte in the standard IP header, as defined in ETF RFC 791 (1981) (available from www.ietf.org). The first three bits (0 to 2) of the TOS byte represent a precedence field with eight defined values (specifically, "Network Control", "Internetwork Control", "CRITIC/ECP", "Flash Override", "Flash", "Immediate", "Priority" and "Routine"). Apart from Router Table updates and similar networking functions, the precedence bits are not widely used in most networks today.

The next four bits (bits 3 to 6—typically referred to as the TOS bits) of the TOS byte represent flags indicating a desired type of service and the last bit (bit 7) is left blank. The TOS bits essentially act as flags to request from the network service levels to: minimize delay; maximize throughput; maximize reliability; or minimize monetary cost. An application can set any one of the four TOS bits as desired or, if none are set, it is assumed that normal service is desired. Suggested settings of the TOS bits for common applications were described in IETF RFC 1600 (Reynolds and Postel, 1992) and IETF RFC 1609 (Almquist, 1992). As specific examples, it is recommended in these documents that FTP control packets have the minimize delay bit set, that FTP data packets have the maximize throughput bit set and that usenet (NNTP) packets have the minimize monetary cost bit set.

While TOS provides some ability to provide QoS, it is very limited. Accordingly, many other attempts have been made to provide QoS mechanisms for IP. For example, RSVP has been proposed as a mechanism for providing QoS assurance in an IP network. Essentially, RSVP reserves resources from network components to provide virtual connections through the otherwise connectionless IP network. RSVP suffers from difficulties in that it is not yet broadly supported and that, even when supported, it assumes that sufficiently large amounts of network resources (bandwidth, etc.) are available to permit some of these resources to be reserved for specific users and/or applications and it can result in inefficient use of these resources.

Additional problems exist when trying to provide QoS over an IP network that is implemented on a physical layer with higher error probabilities. Specifically, IP was designed for, and assumes, a reliable physical layer, such as wired Ethernet or the like where congestion may be a problem, but where large amounts of generally reliable bandwidth are available. To date, implementing QoS-enabled IP based networks over less reliable physical layers, such as radio channels, has been difficult.

Further, to date most attempts at implementing QoS for IP networks have taken an end to end approach and have not addressed networks with heterogeneous physical layers, such as networks with both wired and radio links. Different physical layers can result in much different QoS mechanisms being required.

Also, in radio systems, such as that proposed by the third generation partnership project (3GPP), QoS must typically be provided at the physical layer of the system, requiring different channels to provide different QoS levels. Obviously, this can severely limit the range of QoS offerings that can be provided in a network.

It is desired to have a broadly QoS-enabled IP network which can operate on a variety of physical layers, including relatively unreliable layers such as radio channels, and/or in networks with heterogeneous physical links.

SUMMARY

An apparatus, system and method for transmitting data flows having different quality of service (QoS) attributes over a network link structured in two or more channels is provided. The method classifies arriving packets to determine their required/assigned QoS attributes and places the classified packets into one of several logical channel queues, the selected logical channel queue having an appropriate corresponding set of QoS attributes defined. A radio link controller examines the available channels and, for each channel, selects a logical channel queue whose contents will be transmitted thereon. The radio link controller determines the data transmission capacity for each channel and segments the contents of the selected logical channel to fit within the determined capacity. The selection of the logical channel queue is performed in accordance with the set of QoS attributes and thus each flow can have different QoS characteristics including priorities, reliabilities (ARQ, no ARQ, etc.).

The present disclosure provides a novel apparatus, system and method for transmitting at least two data flows over a telecommunications link structured into at least two channels, each data flow having different QoS attributes which obviates or mitigates at least one of the above-identified disadvantages of the prior art.

According to a first aspect of the present disclosure, there is provided a method of transmitting at least two data flows over a telecommunications link, wherein each data flow can have a different set of quality of service attributes defined for it, comprising the steps of: (i) receiving a packet for transmission over said link; (ii) examining said packet to determine an appropriate set of quality of service attributes required for it; (iii) placing said examined packet into one of a plurality of logical channel queues, said one logical channel queue having defined therefor quality of service attributes corresponding to the determined quality of service attributes required for said packet; (iv) determining a data transmission capacity for said link and selecting one of said plurality of logical channel queues which holds data to be transmitted with the highest priority for transmission and packaging and transmitting as much data from said logical channel queue as can be packaged to fit within said determined transmission capacity of said channel; and (v) repeating steps (i) through (iii) and step (iv) as necessary.

Preferably, the telecommunications link is structured into two or more channels, each of which can have different amounts of data transmission capacity and each of the logical channel queues can be assigned to one or more of the channels. In this case, the determined data transmission capacity is determined for each channel and, for each channel, one of the assigned logical channel queues is selected for transmission. Also preferably, each of the channels can be either a dedicated channel, between a pair of endpoints, or a broadcast channel between an endpoint and a plurality of other endpoints. Also preferably, for one to many endpoint configurations, a set of logical channel queues is defined at the one endpoint for transmissions to each of the many endpoints.

According to another aspect of the present disclosure, there is provided a system for the transmission of data flows from a first endpoint to one or more of a plurality of other endpoints through a link where each flow can have different quality of service attributes defined therefor, comprising: (i) a network interface at said first endpoint to receive packets from said data flows for transmission through said link to said other endpoints; (ii) a set of logical channel queues, each of said logical channel queues in said set being operable to queue a received packet and having a set of defined quality of service attributes defined for the contents of the queue; (iii) a packet classifier to examine said received packets to determine the quality of service attributes for said packet and to place received packets into selected ones of said logical channel queues with corresponding quality of service attributes; and (iv) a link controller which determines the available data transmission capacity to said plurality of end points and which selects for transmission a portion of a packet from the logical channel queue whose contents have the highest priority, the link controller segmenting the packet as necessary to have the portion fit within the data transmission capacity of said link.

Preferably, the system maintains a set of logical channel queues at the first end point for each of said plurality of other endpoints. Also preferably, the link is structured into two or more channels and the link controller selects, for each of the at least two channels, a portion of a packet from a logical channel queue for transmission to at least one of the plurality of endpoints. Also preferably, at least one of these least two channels is a dedicated channel between the first end point and one of the plurality of endpoints and another of the at least two channels is a broadcast channel from the first endpoint to at least two or more of the plurality of other endpoints. Also preferably, the link controller is operable to change the structure of each dedicated channel to alter its data transmission capacity to meet the needs of the endpoints.

The present disclosure provides for the efficient utilization of a shared resource, such as a radio link, in a network including heterogeneous links. Data is organized in flows and each flow can be provided with its own logical channel with its own set of QoS attributes. These attributes can include prioritization, latency restrictions, data rate requirements, reliability requirements, etc. Data flows with wildly different quality of service attributes can be multiplexed onto a single link, which can have variable data transmission capacities, and the necessary differentiated quality of service for these flows can be efficiently provided. The range and/or types of attributes are not particularly limited and can include attributes such as: whether ARQ is to be provided; whether header compression is to be performed; priority; tolerance or intolerance to latency; etc.

BRIEF DESCRIPTION OF THE DRAWINGS

Preferred embodiments of the present disclosure will now be described, by way of example only, with reference to the attached Figures, wherein.

DETAILED DESCRIPTION OF PREFERRED EMBODIMENTS

Figure 1:
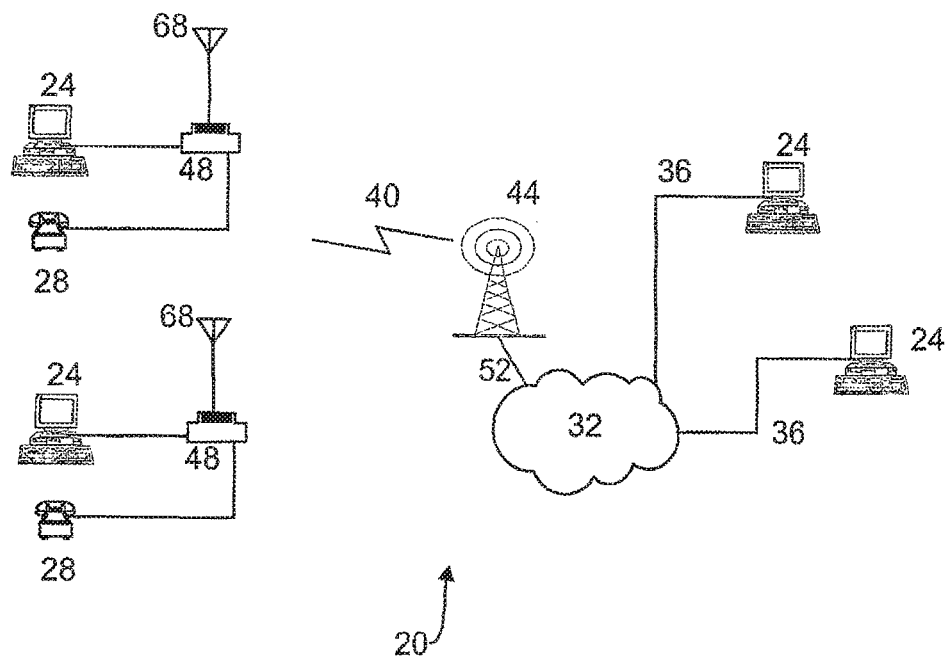
FIG. 1 shows a schematic representation of a network and connected end users, the network being heterogeneous and comprising wireline and radio telecommunications links.

A telecommunication system 20 is illustrated in FIG. 1 and comprises a variety of end user data 24 and telephony 28 terminals connected by a network 32. Network 32 can be any suitable telecommunications network, such as a packet network implemented using IP and running on a wireline or optical backbone, etc.

As illustrated, some terminals can be connected to network 32 via wired links 36 such as, for example, Ti, xDSL, cable modem, dial up, fiber optic systems, etc. Other terminals can be connected via wireless links 40 that extend between radio base stations 44 and subscriber stations, such as customer premises equipment (CPE) 48, to which the terminals are connected. The base station 44 and subscriber stations can be components of any radio transmission system suitable for the transmission of data and, in a present embodiment, is the AMOSPHERE™ system manufactured and sold by the assignee of the present disclosure. The AMOSPHERE system employs wideband CDMA between NPM base stations and SOMAport™. CPEs and provides for the fully converged transport of data from CPEs 48, over a shared wireless link 40, to base stations 44 and to and from core network 32 via a backhaul 52. Backhaul 52 can be any suitable backhaul link including, but not limited to, T3, OC3, microwave or other telecommunications links.

Figure 2:
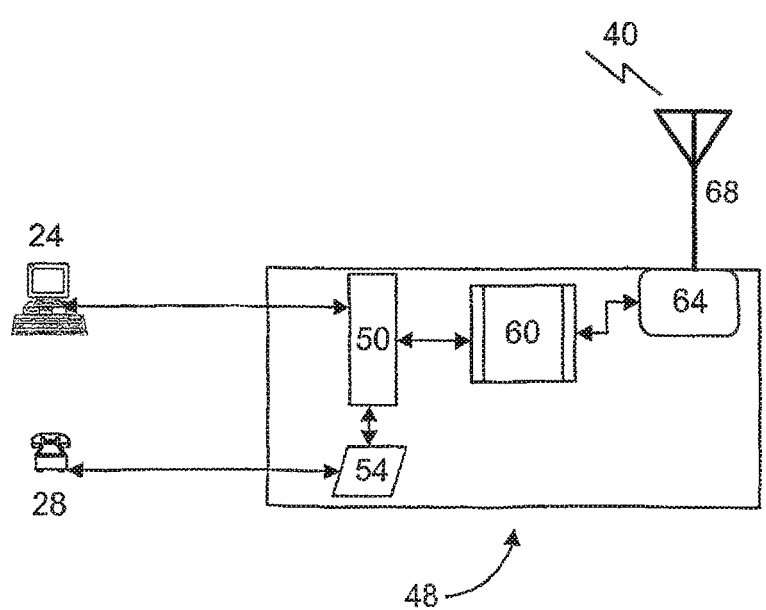
FIG. 2 shows end user terminals connected to a schematic representation of a CPE.

FIG. 2 shows a schematic representation of one possible embodiment of CPE 48 in system 20. As shown, CPE 48 includes a microprocessor assembly 50 that includes one or more input/output ports allowing data terminals 24 to be connected to CPE 48. Similarly, CPE 48 includes a subscriber line interface circuit (SLIC) assembly 54 that provides one or more standard RJ-11 ports, or other suitable interfaces, to connect one or more telephony devices 28 to CPE 48. SLIC assembly 54 also includes A/D and D/A converters, as well as any desired voice codecs, to connect telephony devices 28 to microprocessor assembly 50. CPE 48 can also act as a wireless access point for wireless communication to and from end user terminals within the customer's premises, via any appropriate technology including, but not limited to, 802.11a, 802.11b or 802.11g radio access points, a Bluetooth transceiver, infrared transceiver, or any other suitable technology as will occur to those of skill in the art. Other embodiments of CPE 48 will occur to those of skill in the art, including PCMCIA or other form factor devices that can be connected, or installed in, various user terminals and which can operate in nomadic or mobile applications.

As shown, microprocessor assembly 50 connects, via a modem 60, to a radio transceiver 64 which is, in turn, connected to antenna 68. Data is received over radio link 40 from a base station 44, via antenna 68, and is amplified by radio 64 and demodulated/decoded by modem 60 which provides the resulting data to microprocessor assembly 50. Microprocessor assembly 50 either acts on the received data, if it is a control signal, or passes the data, in the appropriate format, to the appropriate data terminal 24 or to telephony device 28 via SLIC assembly 54.

Similarly, data is received by microprocessor assembly 50 from a data terminal 24 or telephony terminal 28, via SLIC assembly 54, and is modulated and encoded by modem 60, amplified by radio 64 and transmitted, via antenna 68, over radio link 40 to base station 44.

As will be apparent, radio link 40 is subject to a variety of conditions and/or restrictions. For example, typically only a limited amount of radio spectrum (bandwidth) is available for use by radio link 40 and this bandwidth must be shared between all CPEs 48. Also, typically the total amount of data capacity available from the base station 44 to individual CPEs 48 (the downlink) is significantly higher than the data capacity available from CPEs 48 to base station 44 (the uplink). For example, an aggregate rate of twelve megabits per second (mbps) may be available in the downlink while the uplink may be limited to one mbps, or less.

Further, the radio path characteristics between individual CPEs 48 and a base station 44 will vary widely due both to radio propagation factors (distance, orientation, etc.) and due to variations with time (fading, localized interference sources, etc.). Thus, any given CPE 48 will experience radio path characteristics at some times which allow it to receive or send data at some maximum rate (e.g.—five megabits per second) and will experience radio path characteristics at other times which only allow it to receive or send data at some minimum rate (e.g.—five hundred thousand bits per second) and each CPE 48 will experience radio path characteristics between each of these extremes at other times. Accordingly, system 20 must be able effectively use the capacity of radio link 40 even though that capacity will change with time and, in particular, the capacity between individual CPEs 48 and base station 44 can experience significant changes over time.

Also, as radio channels are generally more prone to transmission errors than some other physical media, such as wireline links, it is necessary to appropriately format data for transmission over radio channels, hereinafter referred to as "packaging" of the data. This packaging can include employing error-correcting codes, interleaving the data, selecting the modulation employed, etc. One of the consequences of this packaging is that, typically, the maximum size of the physical layer transport block (i.e.—the largest amount of data that can be transmitted by the physical layer in a time period, such as a single frame) of a radio channel is smaller than would be the case for wireline transmissions. For example, in a wireline network the transport block for an Ethernet system can be fifteen hundred bytes or more in size, while in the above-mentioned AMOSPHERE system, the transport block may be only eleven bytes at minimum on the uplink (CPE 48 to base station 44) and nineteen bytes at minimum on the downlink (base station 44 to CPE 48). Also, rather than transmitting large packets which may have a greater probability of encountering a transmission error, it can be advantageous to transmit smaller packets which can have a reduced probability of experiencing an error and which, in the event of an error, can be retransmitted in less bandwidth than a larger packet would require. Thus, packets from a wireline system and/or a user terminal will usually require fragmentation prior to transmission over radio link 40.

While fragmentation is employed in conventional IP systems when necessary, reassembly of fragmented packets is not typically performed until the packets arrive at their final destination. Further, the overhead (headers, etc.) in performing fragmentation can make it very expensive, in terms of efficient use of bandwidth and resources, to implement even when it is required. As will be described in detail below, in the present disclosure little overhead is required for segmentation of packets and reassembly of segmented packets to the pre-segmentation transport block size can be performed when the segments are received at the end of radio link 40.

Thus, effective use of the radio link 40 requires management of a limited, shared, resource where the capabilities of individual terminals to use that resource can vary widely over time and where the fragmentation of data packets will be the norm. On top of these issues, if QoS is required for the data an extra degree of complexity must be included.

Figure 3:
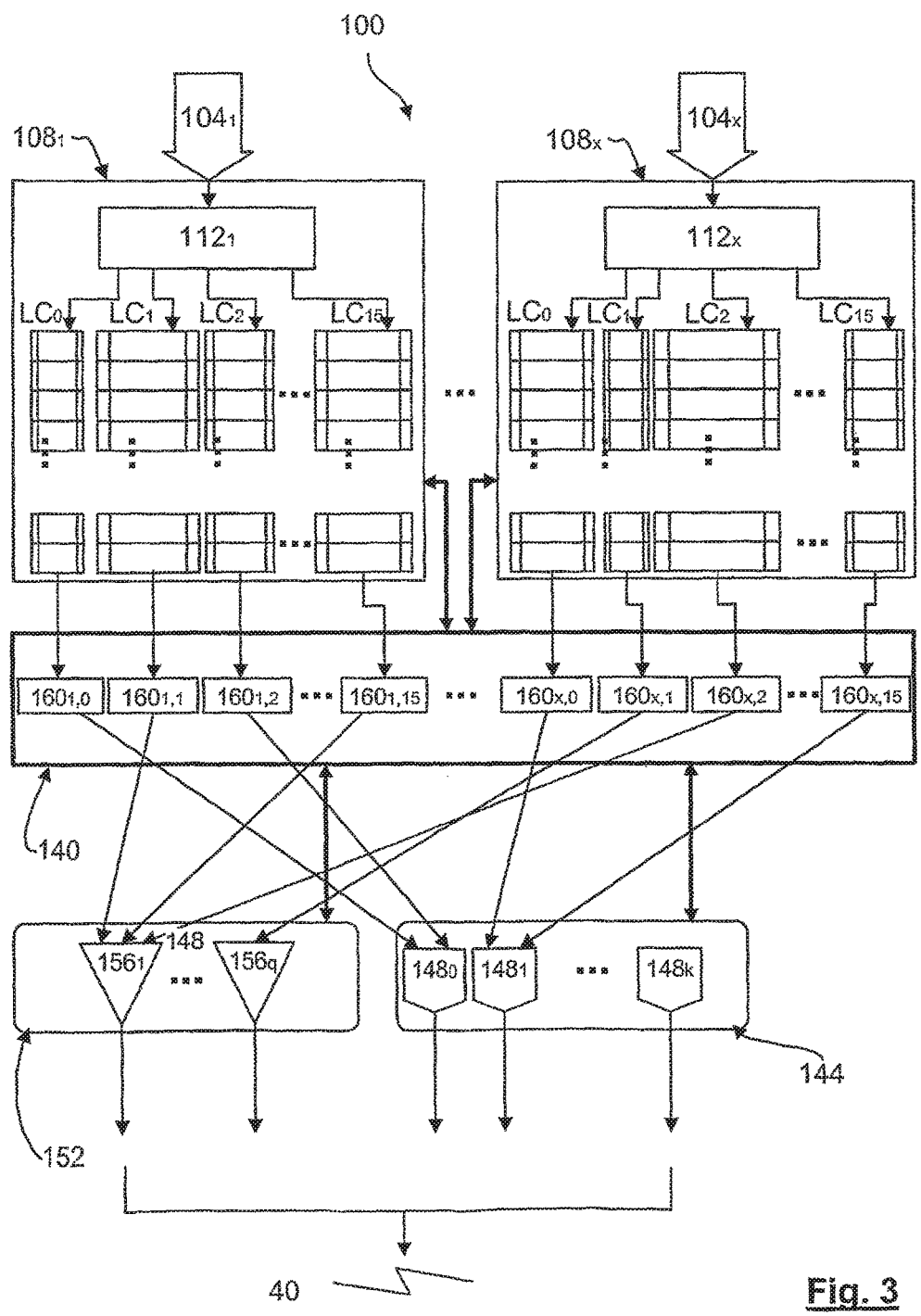
FIG. 3 shows a schematic representation of a QoS processor at a base station, including multiple prioritization and queuing engines.

FIG. 3 shows the QoS processor 100 that runs at base stations 44 in system 20. A separate QoS processor 100 is available for each shared radio link 40, which in the above-mentioned AMOSPHERE system means that each radio sector in a multi-sector base station 44 has its own QoS processor 100. QoS processor 100 includes a network interface port 104.sub.x for each CPE 48.sub.x it serves, through which information to be transmitted to the respective CPE 48.sub.x is delivered. Each network interface port 104 feeds into a respective prioritization and queuing engine (PQE) 108.sub.x, each of which in turn includes a data classifier 112 and a set of logical channel queues LC.sub.0 to LC.sub.i. In the illustrated embodiment of the disclosure, each PQE 108 includes sixteen logical channel queues, specifically, LC.sub.0 through LC.sub.15. Logical channel queues LC.sub.i comprise queues of packets to be transmitted, where each entry in a queue holds one packet. The size of the packets placed into the queues of different logical channel queues LC.sub.i can differ as necessary. For example, a voice telephony data packet may be twenty bytes while a web browsing session data packet can be several hundred bytes or more.

As each packet arrives at a network interface port 104.sub.x, classifier 112.sub.x examines the packet to route it to an appropriate one of the up to sixteen logical channel queues LC.sub.i in PQE 108.sub.x. Classifier 112.sub.x can perform the classification based upon a variety of factors, including: the IP header TOS field contents; the source and/or destination IP addresses and ports; the payload type (if known); payload length; etc.

Typically, each data flow from a base station 44 to a CPE 48, or vice versa, is assigned to a different logical channel queue LC.sub.i and each logical channel queue LC.sub.i has an appropriate priority and set of QoS attributes defined for it. A data flow can be any communication need served by the network, for example a web browsing session can be one flow, while each of two telephony calls can be other flows and a file transfer can be a fourth flow. As used herein, and as discussed further below, the term "QoS attributes" can include a wide variety of attributes including, but not limited to: traffic shaping; segmentation prohibition; priority; data rate; latency; reliability; header compression techniques; probability of block errors; etc.

For example: LC.sub.0 and LC.sub.1 can be defined with the low latency, high error tolerance, header compression QoS attributes suitable for voice data, if two voice connections are being provided between the base station 44 and a CPE 48; LC.sub.2 can be defined with the moderate tolerance for latency, low error tolerance QoS attributes appropriate to a web browsing session; LC.sub.3 can be defined with suitable QoS attributes (tolerance for high latency and low tolerance for errors, i.e.—ARQ enabled) for email; LC.sub.4 can be defined with appropriate QoS attributes for streaming media, such as video; LC.sub.5 can be defined with QoS attributes suitable for system control and messaging signals; and LC.sub.6 can be defined with the low latency, low error tolerance QoS attributes suitable for fax data using the T.38 protocol, etc. Logical channel queues can be instantiated as needed and the QoS attributes can be defined and/or modified as required, as discussed further below.

Figure 4:
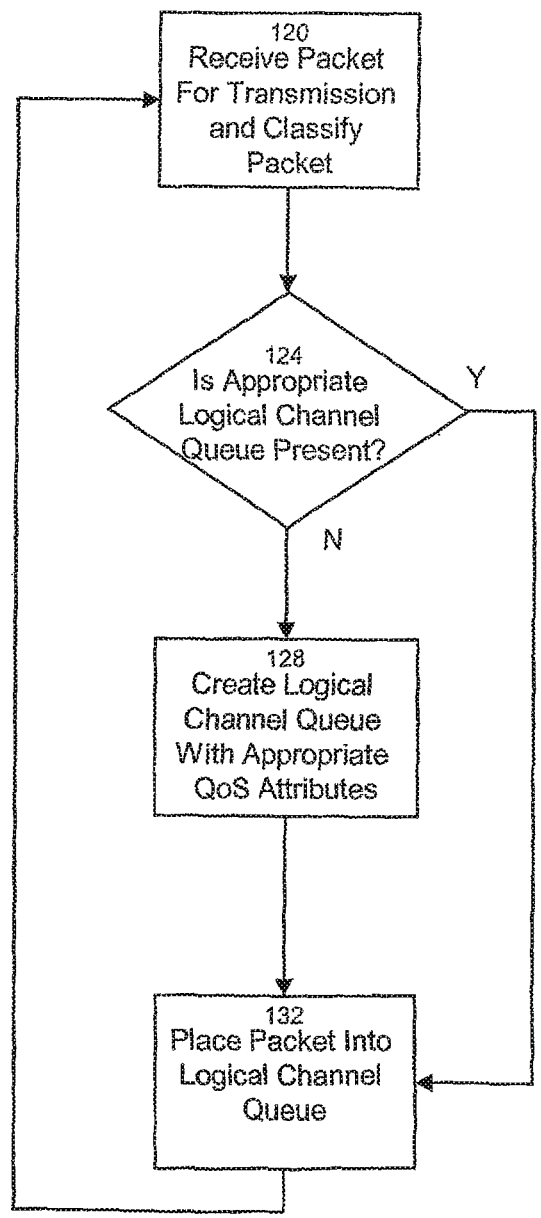
FIG. 4 is a flowchart representing the steps performed within the QoS processor upon receipt of a packet for transmission.

FIG. 4 shows a flowchart of the above-described process. At step 120, a packet is received at a PQE 108 from network interface port 104 and is classified by classifier 112. Classifier 112 determines the appropriate QoS attributes for the received packet. At step 124, classifier 112 determines if a logical channel queue LC is available for the packet and if such a logical channel queue is not available, the method creates the required logical channel queue at step 128, either by creating a new logical channel queue with the necessary QoS attributes, or by modifying the QoS attributes of an existing, empty, logical channel queue. When the required logical channel queue is available, the method enqueues the received packet at step 132.

As described below, each logical channel queue LC.sub.i performs prioritized scheduling of packets enqueued in it and data is transmitted from the logical channel queue LC.sub.i in a non-preemptive manner. Specifically, as each packet is added to a logical channel queue, its priority, relative to the already enqueued packets, is determined. The highest priority packet in the queue is selected for transmission and, as described below, once transmission is commenced, transmission of this packet is not interrupted by other packets in the logical channel queue LC.sub.i, even if a higher priority packet is subsequently enqueued.

Logical channel queues LC.sub.i make their enqueued data available to a Radio Link Controller (RLC) 140. RLC 140 identifies radio available resources and feeds the enqueued data from the logical channel queues LC.sub.i in each PQE 108.sub.x to one or more of the available radio resources.

In the embodiment of FIG. 3, the available radio resources comprise a pool 144 of dedicated data channels (DDCHs) 148.sub.1 through 148.sub.k and a pool 152 of shared broadcast data channels (BDCHs) 156.sub.1 through 156.sub.q. In system 20, DDCHs 148 and BDCHs 156 can be assigned different amounts of the total capacity of radio link 40. In a present embodiment of the disclosure, three BDCHs 156 are available in pool 152 and a number, typically anywhere between twenty and eighty, of DDCHs 148 can be available in pool 144 and the DDCHs 148 can have different amounts of capacity assigned to them. The creation and deletion of DDCHs 148 and the assignment and/or reassignment of DDCHs 148 is performed dynamically by system 20.

DDCHs 148 are data channels assigned to a CPE 48 for the duration of a connection session. A DDCH 148 can only have a single CPE 48 assigned to it and as a DDCH 148 can have a variable amount of capacity (effectively a data transmission rate) assigned to it, a CPE 48 only has one DDCH 148 assigned to it. The amount of capacity assigned to a particular DDCH 148 can be dynamically changed by system 20 as the requirements for the session change and/or as the amount of overall resources required or available in the sector of the base station 44 change. There is some overhead and/or delay in setting up and assigning a DDCH 148 for a CPE 48 and/or resizing or tearing down such a channel.

BDCHs 156 are broadcast channels and are available whenever the base station 44 is operating. Each CPE 48 served by a base station 44, or by a sector (a shared radio link 40) in the case of a multi-sector base station 44, receives and monitors at least one, and typically three, of the BDCHs 156 in pool 152 for data addressed to the CPE 48. Because BDCHs 156 are broadcast channels, after start up of a base station 44 there is no additional requirement or overhead to setup the BDCH channel to send data to a CPE 48. Each BDCH 156 transmits blocks of information and can transmit blocks to any CPEs 48 receiving it by addressing the block to the intended CPE 48. A particular embodiment of a suitable BDCH 156 is described in published PCT application WO 01/91407 (to Mantha), assigned to the assignee of the present disclosure.

Suitable methods for managing the capacity resources (i.e.—admitting CPEs 48 to the network and providing capacity to them) of a base station 44, or of the sectors of a multi-sector base station 44, will be apparent to those of skill in the art and are outside the scope of the present disclosure and will not be discussed further herein. However, the number of DDCHs 148 and their capacities and the scheduling of BDCH blocks to CPEs 48 are all factors that QoS processor 100 and RLC 140 must cope with. In a present embodiment of the disclosure, the logical channel queues of a PQE 108.sub.x can be assigned to any two of the available BDCHs 156 that the destination CPE 48 is receiving and to one of the available DDCHs 148, although as mentioned above these DDCHs 148 can have different maximum data transfer rates, etc. As will be apparent to those of skill in the art, the present disclosure is not limited to being assigned to two BDCHs 156, nor to one DDCH 148 and in fact, having more than one DDCH 148 assigned permits implementation of desirable features such as soft or softer hand-off between sectors or base stations wherein each downlink DDCH 148 is transmitted from a different sector or base station 44.

RLC 140 performs the prioritization, segmentation and, if desired, traffic shaping of data packets for transmission over the available radio resources. Specifically, RLC 140 includes a segmentation cache 160 for each logical channel queue LC.sub.i in each PQE 108.sub.x. Each segmentation cache 160 takes the highest priority packet, at any respective time, from its respective logical channel queue LC.sub.i and stores it within the cache until it has been completely transmitted over one or more of BDCHs 156 or DDCHs 148. Thus, the above-mentioned non-preemptive (within the logical channel queue) scheduling of the transmission of the highest priority packet in each logical channel queue LC.sub.i is achieved.

RLC 140 communicates with each PQE 108.sub.x and with pool 152 and pool 144 to determine the transmission requirements for the logical channel queues and the radio resources available to serve them. RLC 140 examines the segmentation caches 160.sub.x,i for each PQE 108.sub.x to determine the cached packet, or remaining portion of a packet, with the highest priority. Pools 144 and 152 report the available capacity of each of their respective channels assigned to a PQE 108.sub.x to RLC 140 which will then select the contents of a segmentation cache 160.sub.x,1 for the next transmission on a channel (DDCH or BDCH) assigned to that PQE 108.sub.x channel.

For example, in FIG. 3 PQE 108.sub.x has both BDCHs 156.sub.1 and 156.sub.q and DDCH 148.sub.1 assigned to it. Specifically, LC.sub.0 and LC.sub.15 have been assigned to DDCH 148.sub.1, LC.sub.1 has been assigned to BDCH 156.sub.1 and LC.sub.15 has been assigned to BDCH 156.sub.q. Pool 144 will report its capacity to transmit data on its next transmission frame to RLC 140. For example, pool 144 can report that DDCH 148.sub.1 has the data transmission capacity to transmit twenty-four bytes of data on the next transmission frame. Similarly, pool 152 can report to RLC 140 that BDCHs 156.sub.1 and 156.sub.q have the data transmission capacity to transmit forty eight and ninety six bytes of data respectively on their next transmission frames.

RLC 140 examines this reported data transmission capacity for DDCH 148.sub.1 and the relative priorities of the data in segmentation caches 160.sub.x,0 and 160.sub.x,15 and selects one of the two caches for transmission, for example the data in segmentation cache 160.sub.x,0. RLC 140 then segments the data in segmentation cache 160.sub.x,0, if necessary, to fit within the reported data transmission capacity of DDCH 148.sub.1 (i.e.—twenty four bytes in the above-mentioned example). This segmented data is then provided to DDCH 148.sub.1 for packaging and transmission in the next frame.

Similarly, RLC 140 examines the reported data transmission capacities for BDCHs 156.sub.1 and 156.sub.q and the contents of the segmentation caches 160 assigned to each of these BDCHs. For each BDCH 156, RLC 140 selects the assigned segmentation cache 160 whose contents have the highest priority. RLC 140 segments the data in that segmentation cache 160, if necessary, to fit within the reported data transmission capacity for the BDCH 156 and this data is then provided to the BDCH 156 for packing and transmission in the next frame.

As will be apparent to those of skill in the art, should the contents of the segmentation cache 160 with the highest priority not require all of the reported data transmission capacity of a DDCH or BDCH, RLC 140 can also include another segment, from the contents of the next highest priority segmentation cache 160 or from another packet from the same logical channel queue which is loaded into the highest priority segmentation cache 160, to utilize all of the available reported data transmission capacity. This can occur, for example, when the highest priority cache contains the last portion of a packet to be transmitted or contains a very small packet, and the data to be transmitted is less than the reported data transmission capacity. If the channel under consideration is a BDCH 156, RLC 140 can also add another segment from a logical channel queue assigned to the BDCH 156 from another PQE 108.

Figure 5:
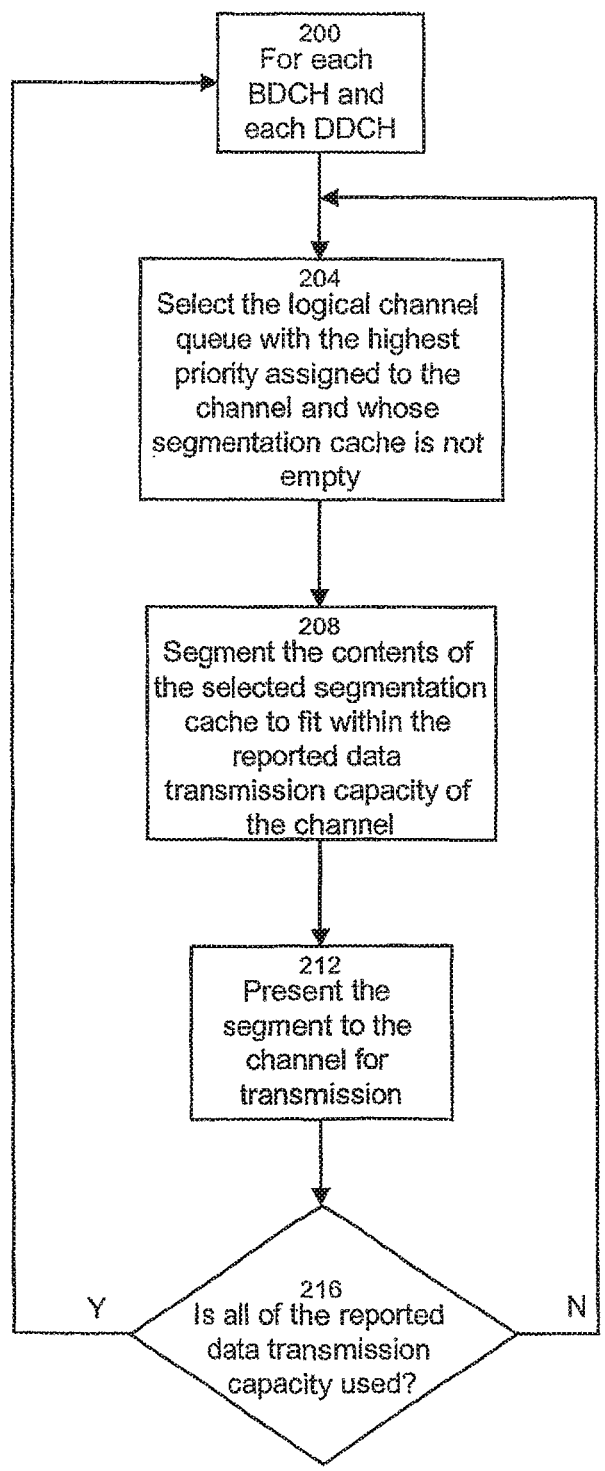
FIG. 5 is a flowchart representing the steps performed by a Radio Link Controller to select and transmit a segment of a packet.

FIG. 5 shows a flowchart of the above-described process. As indicated at step 200, the method considers, in turn, each and every channel to which one or more segmentation caches 160 are assigned. At step 204, the non-empty segmentation cache 160 of the logical channel queue with the highest priority that is assigned to the channel under consideration is selected. At step 208, a segment of the contents of the selected segmentation cache 160 is formed, if necessary, to fit the data transmission capacity reported to RLC 140 by the channel. At step 212, the segment is presented to the channel for packaging and transmission. At step 216, a check is made to see if all of the reported data transmission capacity has been used. If all the capacity has been used, the process returns to step 200 for the next channel. If less than the total amount of reported data transmission capacity has been used, the process returns to step 204 where, if the channel under consideration is a BDCH 156, all of the logical channel queues (from any PQE 108) assigned to the BDCH 156 are considered by RLC 140 to be included as an additional segment. If the channel under consideration is a DDCH 148, RLC 140 will consider the next highest priority data from the same PQE 108 to be included as an additional segment.

This process is performed by RLC 140 for each frame transmitted from base station 44, which can result in the contents of a different segmentation cache 160 being selected for the next transmission before the contents of another segmentation cache are completely transmitted. Thus, RLC 140 implements a preemptive scheduling method between logical channel queues and/or between PQE's 108.

Figure 6:
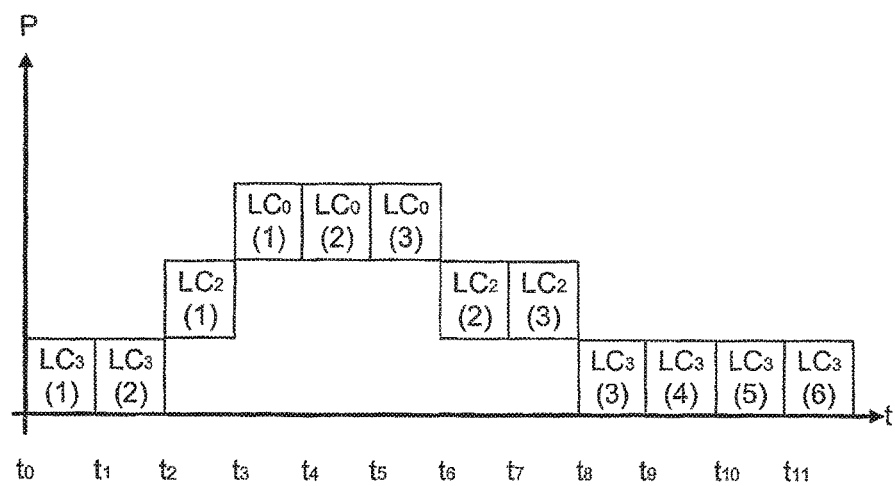
FIG. 6 shows a plot of transmitted packet segments of different priorities.

FIG. 6 shows an example of the results of preemptive scheduling in progress for one DDCH 148 that has at least logical channels LC.sub.0, LC.sub.2 and LC.sub.3 of a PQE 108 assigned to it. As shown in the Figure, in the frame transmitted commencing at time t.sub.0, the data in the segmentation cache for logical channel queue LC.sub.3 is segmented to the reported transmission capacity for DDCH 148 and is transmitted. Another segment of this data is formed and transmitted in the frame commencing transmission at time t.sub.1. While the illustration in the Figure indicates that the segments are the same size, this need not be the case and the reported data transmission capacity can change frame to frame.

For the frame transmitted commencing at time t.sub.2, further transmission of the contents of logical channel queue LC.sub.3 are preempted by the contents that have been placed into the segmentation cache for logical channel queue LC.sub.2 which RLC 140 determines have a higher priority. Thus, in the frame commencing transmission at time t.sub.2, a segment of the contents of the segmentation cache 160 logical channel queue LC.sub.2 is formed for the reported data transmission capacity and is transmitted. For the frame commencing transmission at time t.sub.3, RLC 140 determines that the contents that have been placed in the segmentation cache 160 for logical channel queue LC.sub.0 have yet a higher priority. Accordingly, transmission of the contents of LC.sub.2 is preempted and a segment of logical channel queue LC.sub.0 is formed for the reported data transmission capacity and is transmitted in the frame at time t.sub.3. As no higher priority data is found in the segmentation caches 160 for the logical channel queues assigned to the DDCH 148 during the time periods t.sub.4 and t.sub.5, segmentation and transmission of the remaining contents of the segmentation cache 160 for channel queue LC.sub.0 occur at times t.sub.4 and t.sub.5 until all three segments, representing the entire packet in the segmentation cache for logical channel queue LC.sub.0 have been transmitted.

At time t.sub.6, RLC 140 determines the segmentation cache 160 with the highest remaining priority for transmission. In the illustrated example, the next highest priority data is the remaining portion of the data in the segmentation cache for logical channel queue LC.sub.2 and this data is segmented to fit the reported data transmission capacity and is transmitted in the frames commencing transmission at time t.sub.6 and t.sub.7.

At time t.sub.6, RLC 140 determines the segmentation cache with the highest remaining priority for transmission. In the illustrated example, the next highest priority data is the remaining data in the segmentation cache 160 for logical channel queue LC.sub.3 and this data is segmented to fit the reported transmission capacity and is transmitted in the frames commencing transmission at times t.sub.8, t.sub.9, t.sub.10 and t.sub.11 at which time the complete packet has been transmitted.

Figure 7:
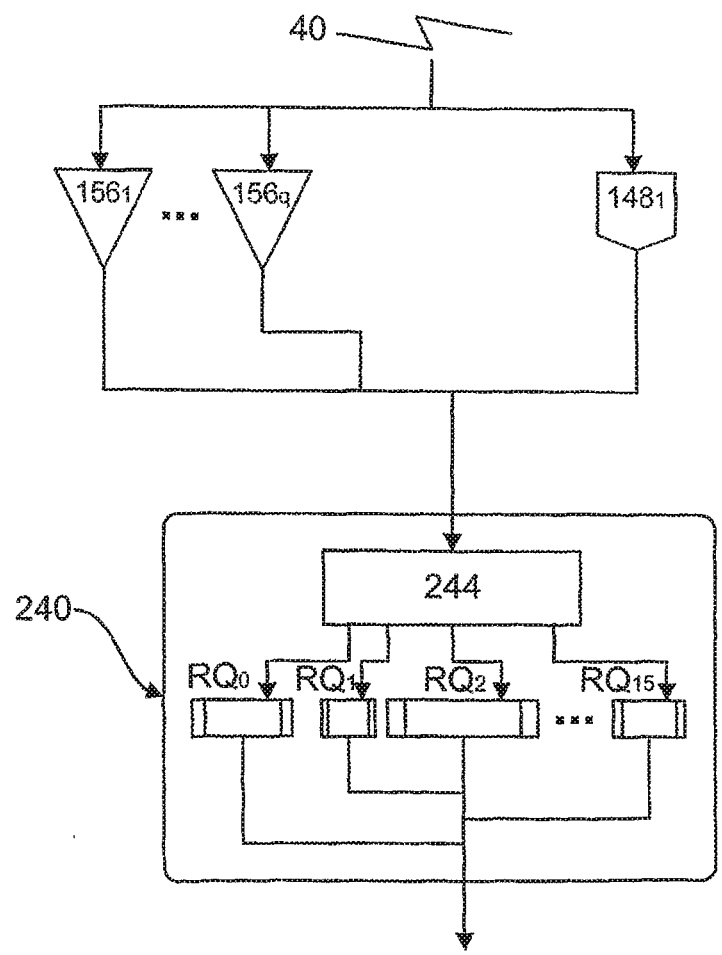
FIG. 7 shows a reassembly controller.

At each CPE 48, a reassembly controller 240 is provided, as illustrated in FIG. 7. Reassembly controller 240 receives data from each BDCH 156 and DDCH 148 channel that are transmitted to it over radio link 40. Data received by reassembly controller 240 is first examined by sequencer 244 that determines which, if any, existing logical channel queue LC at base station 44 was the source of the data. Sequencer 244 will place the received data into the reassembly queue RQ.sub.i associated with the identified logical channel queue LC. If sequencer 244 determines that the data was transmitted by a newly created logical channel queue LC at base station 44, sequencer 244 will cause a complementary reassembly queue RQ.sub.i to be instantiated in reassembly controller 240 and will place the received data therein.

Each reassembly queue RQ.sub.i examines data placed into it and reassembles the data segments into the original data packet. Once reassembly of a packet has been completed, it is output to the appropriate data target in CPE 48 and the reassembly queue RQ.sub.i is emptied for the next received data.

If transmission of a packet from base station 44 did not require segmentation, the received data packet is placed into reassembly queue RQ.sub.i that then immediately outputs it.

As will be apparent to those of skill in the art, a variety of techniques can be employed for dealing with dropped/lost packet segments and received erroneous packets and these techniques are outside the scope of the present disclosure and will not be described herein.

Figure 8:
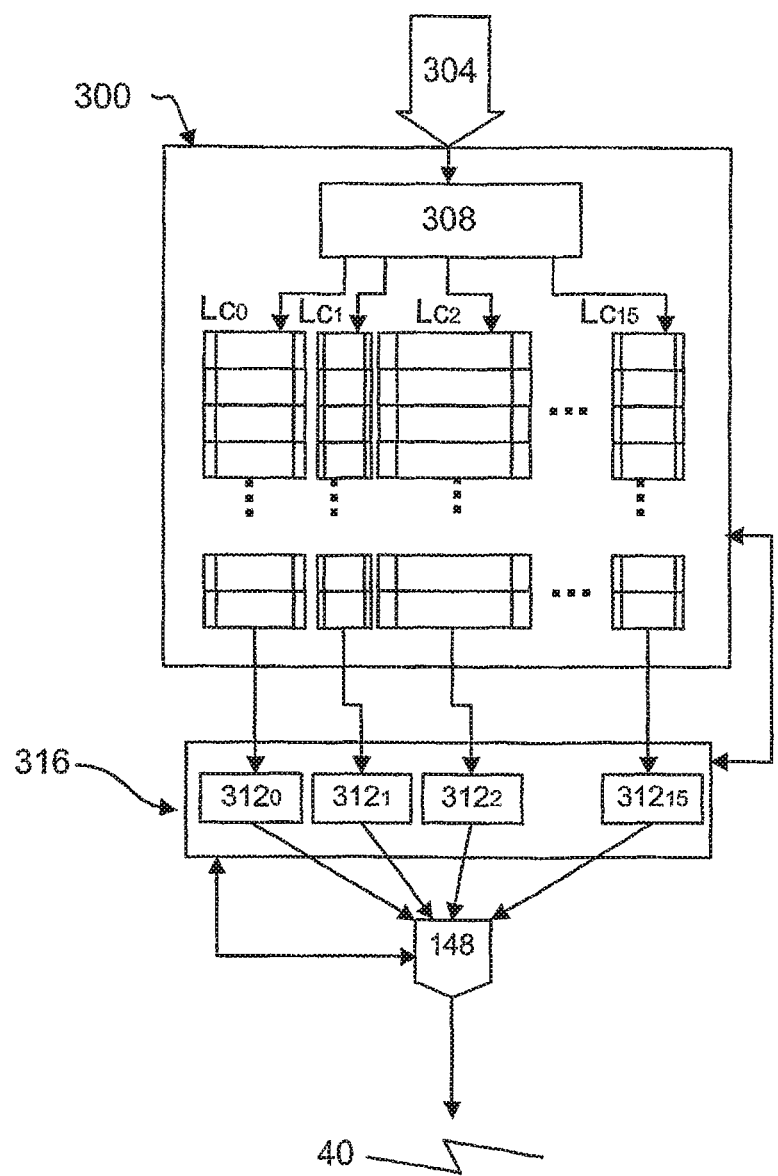
FIG. 8 shows a schematic representation of a prioritization and queuing engine at a CPE.

FIG. 8 shows the prioritization and queuing engine PQE 300 which runs at each CPE 48 in system 20. PQE 300 is similar to PQE 108, although it is somewhat simpler as each CPE 48 only has access to a single uplink DDCH channel 148 on radio link 40 to base station 44. An uplink DDCH channel 148 is assigned to a CPE 48 when needed and, as mentioned above, can provide different amounts of data transmission capacity to meet the needs of the CPE 48 to which it is assigned. As was mentioned above, suitable methods for managing the capacity resources (i.e.—admitting CPEs 48 to the network and providing uplink capacity to them) in system 20 will be apparent to those of skill in the art and are outside the scope of the present disclosure and will not be discussed further herein.

PQE 300 includes a network interface port 304 to which applications and/or processes running on the CPE 48, or the data terminals attached to it, send the information to be transmitted to base station 44. Data received at port 304 is classified by classifier 308, which performs the same functions as classifier 112, discussed above with reference to PQEs 108. In the illustrated embodiment of the disclosure, each PQE 300 includes sixteen logical channel queues, specifically, Lc.sub.0 through Lc.sub.15 and each logical channel queue Lc.sub.i has an appropriate priority and set of QoS attributes defined for it. While it is contemplated that one or more logical channel queues will be predefined for PQE 300, additional logical channel queues Lc.sub.i can be created or removed, as desired, and the QoS attributes defined for each logical channel queue Lc.sub.i can be set and reset as required.

Each logical channel queue Lc.sub.i has an associated segmentation cache 312.sub.i defined for it that performs the same functions as segmentation caches 160, discussed above with reference to PQEs 108.

Each CPE 48 also includes a radio link controller RLC 316 that operates to receive reported data traffic capacity information from DDCH 148 and to select the segmentation cache 312.sub.i whose contents have the highest priority for transmission. If necessary, PLC 316 will segment the contents of the selected cache 312.sub.i to fit the reported data traffic capacity and will provide the data (whether segmented or not) to DDCH 148 for transmission as the next transmitted frame.

At base station 44, a reassembly controller (not shown) is provided for each uplink DDCH 148 then assigned to a CPE

48. These reassembly controllers are similar to those discussed above with respect to FIG. 7, and operate to reassemble segmented packets transmitted over the DDCHs 148 before forwarding the packets to their destination in base station 44 or elsewhere.

As will now be apparent, the present disclosure provides QoS services for data flows with wildly different requirements over a link that has time varying capacities. The multiple logical channels queues share a single link and yet each queue can be provided with different QoS attributes appropriate to its needs even while the data transmission capacity of the link changes with time. In the downlink direction, the link can be structured into multiple channels and the logical channel queues can be mapped to one or more of these channels. These channels can include dedicated channels, each dedicate to a link between the base station 44 and a CPE 48, with variable data transmission capacities and one or more channels can be broadcast channels from the base station 44 to several, or all, of CPEs 48. In the uplink, the logical channel queues are mapped to a single dedicated channel that can have a variable data transmission capacity.

One of the advantages of the present disclosure is that it allows QoS attributes to be defined and provided on a per logical channel basis which allows for network resources to be used efficiently, to provide differentiated QoS on a per data flow basis and to support QoS services over a wireless link. This allows, for example, the logical channel for a media connection such as a voice telephony data flow, to be defined with attributes for segmentation prohibition, low latency and low reliability which are suitable for such a connections, as a voice call is sensitive to latency, but can tolerate some dropped packets and its packets are always of a known size, as required by the particular codec employed.

In such a situation, RLC 140 will attempt to ensure that packets in such a logical channel queue are transmitted with the required time periods (to meet the latency requirements) but without ARQ or other reliability techniques being applied to it. Conversely, a file transfer, such as an ftp session, between a CPE 48 and a base station 44 can be transmitted through a logical channel queue that has defined attributes for being latency tolerant, but requiring high reliability. Similarly, fax data may be transmitted through a logical channel queue that has defined attributes for being latency intolerant and requiring high reliability, so that ARQ or other reliability techniques are applied. As mentioned, reliability techniques such as ARQ can be provided on a per logical channel basis. Further, less conventional attributes, such as higher error correcting coding levels or even radio transmission power level margins can also be defined and implemented on a per logical channel basis. Also, other attributes such as whether and which types of header compression to apply to a flow can be defined per flow.

Further, traffic shapers can be implemented and configured on a per logical channel basis. This allows, for example, voice telephony data to be transferred over link 40 as necessary, while other data types can be data rate limited according to parameters defined by the network operator. Thus, a telephony call can be conducted unimpeded while a file transfer or other large data transfer can be subject to a leaky bucket, or other traffic shaping process.

As should now be apparent to those of skill in the art, the unique flexibility described above is achieved with a very low overhead impact on the transmission link capacity. Transmission of segments involves only the addition of a small header to each segment, the header identifying the sending logical channel and, in the case were segmentation of the packet has occurred, an indication of the segmentation of the packet and the location of the segment within the full packet.

The present disclosure provides for the efficient utilization of a shared resource, such as a radio link, in a network including heterogeneous links. Data is arranged in flows and each flow can be provided with its own logical channel with its own set of QoS attributes. These attributes can include prioritization, latency restrictions, data rate requirements, reliability requirements, etc.

The above-described embodiments are intended to be examples of the present invention, and alterations and modifications may be effected thereto by those of ordinary skill in the pertinent art without departing from the scope of the invention, which is defined solely by the issued claims.

I claim:
1. A base station, comprising:
   a reassembly controller
      operable to receive, over a single dedicated channel, a plurality of segmented packets from a wireless subscriber station, each respective segmented packet of the plurality of segmented packets associated with a respective quality of service (QoS), the single dedicated channel carrying segmented packets associated with a plurality of logical channel queues,
      operable to reassemble the plurality of segmented packets to form a higher layer packet, and
      operable to forward the higher layer packet towards a destination; and
   a QoS processor operable to prioritize packets for transmission.
2. The base station of claim 1 wherein the reassembly controller comprises:
   a plurality of reassembly queues operable to receive segmented packets of the plurality of segmented packets and to reassemble segmented packets to form a higher layer packet; and
   a sequencer operable to place each respective segmented packet of the plurality of segmented packets into a reassembly queue associated with the segmented packet.
3. A method for operating a base station, the method comprising:
   receive, over a single dedicated channel, a plurality of segmented packets from a wireless subscriber station, each respective segmented packet of the plurality of segmented packets associated with a respective quality of service (QoS), the single dedicated channel carrying segmented packets associated with a plurality of logical channel queues;
   reassemble the plurality of segmented packets to form a higher layer packet; and
   forward the higher layer packet towards a destination.

\* \* \* \* \*